(12) United States Patent
Gobby et al.

(10) Patent No.: US 9,138,694 B2
(45) Date of Patent: Sep. 22, 2015

(54) MIXING APPARATUS

(71) Applicant: Lucite International UK Limited, Hampshire (GB)

(72) Inventors: Darren Gobby, Redcar (GB); John Colin Middleton, Bedfordshire (GB); Neil Tindale, Redcar (GB)

(73) Assignee: Lucite International UK Limited, Southampton (GB)

( * ) Notice: Subject to any disclaimer, the term of this patent is extended or adjusted under 35 U.S.C. 154(b) by 0 days.

(21) Appl. No.: 13/763,393

(22) Filed: Feb. 8, 2013

(65) Prior Publication Data

US 2013/0150618 A1    Jun. 13, 2013

Related U.S. Application Data

(63) Continuation of application No. 12/300,072, filed as application No. PCT/GB2007/015424 on Apr. 25, 2007.

(30) Foreign Application Priority Data

May 10, 2006    (GB) .................................. 0609219.1

(51) Int. Cl.
*B01J 19/18*    (2006.01)
*B01F 3/04*    (2006.01)
(Continued)

(52) U.S. Cl.
CPC ......... *B01F 3/04531* (2013.01); *B01F 7/00341* (2013.01); *B01F 7/00633* (2013.01);
(Continued)

(58) Field of Classification Search
CPC ............... B01J 3/04531; B01J 19/1806; B01J 19/0066; B01F 7/00341; B01F 7/00633; B01F 7/00641; B01F 2215/0459; B01F 2215/0463; B01F 2215/0481
USPC .......... 422/225, 224; 366/330.1, 265; 261/84, 261/93; 562/521; 585/603
See application file for complete search history.

(56) References Cited

U.S. PATENT DOCUMENTS 3,252,689 A    5/1966    Blomgren, Jr. et al.
3,330,818 A    7/1967    Derby
(Continued)

FOREIGN PATENT DOCUMENTS

CH    332 926 A    9/1958
DE    44 21 478 A1    12/1995
(Continued)

OTHER PUBLICATIONS

Decision of Rejection issued in Japanese Application No. 2009-508450 dated Sep. 11, 2012.
(Continued)

*Primary Examiner* — Lessanework Seifu
(74) *Attorney, Agent, or Firm* — Venable LLP; Michael A. Sartori; Steven J. Schwarz

(57) ABSTRACT

A mixing apparatus 100 for mixing at least two fluids, the mixing apparatus 100 comprising a shaft 120 rotatable about its longitudinal axis 121, a first 122 and a second 124 radially extending impeller mounted on the shaft 120 and respectively axially spaced apart, characterised in that the first impeller 122 comprises a plurality of curved blades 125 operable to move said fluids in an axial direction towards the second impeller 124, and the second impeller 124 comprises a plurality of curved blades 125 operable to move said fluids in an axial direction towards the first impeller 122.

11 Claims, 4 Drawing Sheets

(51) Int. Cl.
*B01F 7/00* (2006.01)
*B01J 10/00* (2006.01)
*B01J 19/00* (2006.01)

(52) U.S. Cl.
CPC ............ *B01J10/002* (2013.01); *B01J 19/0066* (2013.01); *B01J 19/1806* (2013.01); *B01F 2003/04631* (2013.01); *B01F 2003/04645* (2013.01); *B01F 2003/04673* (2013.01); *B01F 2003/04907* (2013.01); *B01F 2003/04914* (2013.01); *B01F 2215/0481* (2013.01); *B01J 2219/00779* (2013.01)

(56) References Cited

U.S. PATENT DOCUMENTS

| | | | |
|---|---|---|---|
| 4,004,786 A | 1/1977 | Stephens | |
| 4,013,273 A | 3/1977 | Danyliw | |
| 4,401,645 A | 8/1983 | Gisler | |
| 4,468,130 A * | 8/1984 | Weetman | 366/330.2 |
| 4,594,228 A * | 6/1986 | Lambert et al. | 422/218 |
| 4,786,443 A | 11/1988 | Drent et al. | |
| 4,934,828 A | 6/1990 | Janssen | |
| 4,960,926 A | 10/1990 | Drent | |
| 5,145,255 A | 9/1992 | Shimada et al. | |
| 5,158,921 A | 10/1992 | Drent et al. | |
| 6,639,091 B2 * | 10/2003 | Drent et al. | 556/21 |
| 6,984,668 B1 | 1/2006 | Eastham et al. | |
| 7,168,849 B2 | 1/2007 | Adams | |
| 2003/0227816 A1 | 12/2003 | Okamoto et al. | |
| 2004/0042942 A1 | 3/2004 | Siccardi, Jr. | |
| 2006/0106259 A1 | 5/2006 | Eastham et al. | |
| 2006/0122435 A1 | 6/2006 | Eastham et al. | |
| 2006/0128985 A1 | 6/2006 | Eastham et al. | |
| 2006/0252935 A1 | 11/2006 | Eastham et al. | |
| 2007/0282124 A1 | 12/2007 | Eastham et al. | |
| 2008/0051475 A1 | 2/2008 | Eastham et al. | |
| 2008/0086015 A1 | 4/2008 | Eastham | |

FOREIGN PATENT DOCUMENTS

| | | |
|---|---|---|
| DE | 203 06 404 U1 | 6/2003 |
| EP | 0 055 875 A1 | 7/1982 |
| EP | 0 106 379 A1 | 4/1984 |
| EP | 0 227 160 A2 | 7/1987 |
| EP | 0 235 864 A1 | 9/1987 |
| EP | 0 274 795 A2 | 7/1988 |
| EP | 0 282 142 A1 | 9/1988 |
| EP | 0 386 833 A1 | 9/1990 |
| EP | 0 441 447 A1 | 8/1991 |
| EP | 0 489 472 A2 | 6/1992 |
| EP | 0 495 547 A2 | 7/1992 |
| EP | 0 495 548 A2 | 7/1992 |
| EP | 0 499 329 A1 | 8/1992 |
| EP | 1 204 476 | 5/2002 |
| EP | 1 527 038 | 5/2005 |
| EP | 1 534 427 | 6/2005 |
| EP | 1 554 039 | 7/2005 |
| EP | 1 565 425 | 8/2005 |
| EP | 1 651 587 | 5/2006 |
| JP | 42-27033 | 12/1967 |
| JP | 62-45330 | 2/1987 |
| JP | 07-008776 | 1/1995 |
| JP | 08-010597 | 1/1996 |
| JP | 09-150048 | 6/1997 |
| JP | 10-235176 | 9/1998 |
| WO | WO-01/10551 A1 | 2/2001 |
| WO | WO-03/072235 | 9/2003 |
| WO | WO-2004/014552 A1 | 2/2004 |
| WO | WO-2004/014834 A1 | 2/2004 |
| WO | WO-2004/024322 A2 | 3/2004 |
| WO | WO-2004/050599 A1 | 6/2004 |
| WO | WO-2005/003070 A1 | 1/2005 |
| WO | WO-2005/079981 A1 | 9/2005 |
| WO | WO-2005/118519 A1 | 12/2005 |

OTHER PUBLICATIONS

Office Action issued in Taiwanese Application No. 096108224 dated Feb. 6, 2013.
Office Action issued in Taiwanese Application No. 096108224 dated Feb. 21, 2013.
Office Action issued in Korean Application No. 10-2008-7027240 dated Jun. 17, 2013.
Communication from Appeal Board issued in Japanese Application No. 2009-508450 dated Apr. 23, 2013.
Office Action issued in Canadian Application No. 2,650,969 dated Jul. 19, 2013.
Office Action issued in Malaysian Application No. PI 20084480 dated Jun. 14, 2013.
Office Action issued in Japanese Patent Application No. 2009-508450 dated Aug. 27, 2013.
Notice of Final Rejection issued in Korean Patent Application No. 10-2008-7027240 on Dec. 30, 2013.
Kuboi et. al., "The Power Drawn by Dual Impeller Systems Under Gassed and Ungassed Conditions" Fouth European Conference on Mixing, Congres Centre, Noordwijkerhout, The Netherlands, pp. 247-261, Apr. 27-29, 1982.
Paul et al., Handbook of Industrial Mixing: Science and Practice, 2004, pp. 345-390, John Wiley & Sons, Inc.

* cited by examiner

MIXING APPARATUS

The invention relates to a mixing apparatus. In particular, but not exclusively, the invention relates to an apparatus for dispersing gas in liquid.

Many industrial processes incorporate an impeller driven mixing system, for example, processes for fermentation, hydrogenation, chlorination, oxidation, and carbonylation.

Impeller driven mixing systems generally incorporate one impeller mounted on a rotating shaft. Such systems may be said to have an axial longitudinal flow parallel to the axis of the rotating shaft and/or a radial flow parallel to the radially extending blades mounted on the shaft. The impeller may thus be a radial flow impeller which projects fluid in a radial direction towards a wall of a chamber in which the impeller is housed, for example, a Chemineer BT-6™ turbine, or alternatively, the impeller may be an axial flow impeller which comprises radially extending blades that are pitched at an angle so as to direct the fluid flow in an axial direction. Examples of axial flow impellers include marine impellers and hydrofoil impellers. Mixed flow systems are known, where the impeller causes flow in both axial and radial directions. An example of a mixed flow impeller is the 45° pitched blade turbine. Such mixing systems can be used in liquid-liquid, liquid-solid, or liquid-gas reactions.

A dual impeller system for dispersing a gas in a liquid, in a vessel, is known. Specifically, in a paper by Kuboi, entitled "The Power Drawn by Dual Impeller Systems Under Gassed and Ungassed Conditions" Fourth European Conference on Mixing, Apr. 27-29 1982, the combination of two axially spaced 45° pitched blade turbines is disclosed whereby a first impeller is mounted below a second impeller on a common shaft. The impeller blades are orientated such that the first impeller projects liquid upwards and outwards and the second impeller projects liquid downwards and outwards. Under gassed conditions, as gas is introduced into the vessel, the first impeller causes the incoming flow of gas bubbles to split so that some of the flow is driven radially outwards towards the walls of the vessel, and some is driven axially upwards towards the second impeller.

The effectiveness of the two impeller system under gassing conditions depends upon the speed of rotation of the impellers. At lower speeds it is possible that the bubbles that have been projected upwards by the first impeller are not affected by the second impeller. The second impeller is unable to overcome buoyancy forces and therefore the second impeller plays no part in the dispersion of gas in the liquid. Only when the rotational speed of the second impeller is increased are the buoyancy forces overcome. Disadvantageously, non-uniform dispersion of the gas in the liquid results. This is shown in FIG. 1 of the application. In order to achieve uniform dispersion, further disadvantageously, the rotational speed of the second impeller has to be sharply increased.

It is highly desirable to be able to achieve complete uniform dispersion in an industrial process. In industrial processes where gas/liquid mass transfer is an essential feature, this aids controllability and enhances reactor performance. In such processes, when the gas is well dispersed, a region of reasonably uniform turbulent kinetic eddy dissipation can exist in the liquid between and around the impellers which controls coalescence and breakup of the bubbles. If the gas dispersion is highly non-uniform, undesirable coalescence can result in a sharp increase in bubble size and therefore, the surface area for interface mass transfer to occur is reduced. Advantageously, a controlled turbulent kinetic energy dissipation field results in a narrow bubble size distribution over a range of impeller specific powers.

It is an object of the present invention to provide a mixing apparatus which enables controllable mixing of fluids or solids whilst simultaneously providing an effective mixing environment.

According to a first aspect of the present invention there is provided a mixing apparatus for mixing at least two fluids, the mixing apparatus comprising a shaft rotatable about its longitudinal axis, a first and a second radially extending impeller mounted on the shaft and respectively axially spaced apart, characterised in that the first impeller comprises a plurality of curved blades operable to move said fluids in an axial direction towards the second impeller, and the second impeller comprises a plurality of curved blades operable to move said fluids in an axial direction towards the first impeller.

Preferably, the blades on each impeller are inward pumping into the space between the impellers. In the case of a substantially vertical shaft, the lower impeller is, therefore, upward pumping and the upper impeller is downward pumping. Preferably, the blades of each impeller are hydrofoil blades. A suitable hydrofoil blade is the Chemineer Maxflo™ W. Alternatively, the Lightnin A315™, A320™ or A340™ may be used.

Advantageously, due to the opposing axial flows created by the first impeller and the second impeller, a region of high turbulence is observed in a central mixing zone between said impellers. The high turbulence is maintained in this zone, and so there is little variation in the turbulence energy dissipation. Consequently, there is minimal variation in bubble size which results in a narrow size distribution of the bubbles in the central mixing zone. Advantageously, a narrow bubble size distribution enables the process or chemical reaction to be more easily controlled. This region provides a zone where the at least two fluids are brought together to be mixed. A chemical reaction can therefore be facilitated in the central mixing zone. The fluids may be liquid-solid, liquid-liquid, or liquid-gas. Preferably, the at least two fluids comprise a liquid and a gas.

It is advantageous to provide a gas/liquid mixing environment where the bubble size is largely independent of the impeller specific power. In such a system the liquid mixing time may be varied independently of the bubble size.

Preferably, the first impeller and the second impeller each comprise two or more curved blades, more preferably, three or more curved blades. Most preferably, are impellers with four curved blades. The provision of an impeller with a large number of curved blades increases the shear forces acting to break up large bubbles. The small bubbles produced have a smaller average bubble diameter than those produced with a first impeller and/or a second impeller with fewer curved blades and therefore, the available surface area for a reaction to occur is increased.

Preferably, the diameter of the first impeller is the same as the diameter of the second impeller. Preferably, the diameter of the or each impeller is substantially half the diameter of the vessel in which said impeller is mounted.

Advantageously, the smaller the diameter of the impeller, the greater the shear force created for a given power and therefore, a large number of small bubbles are produced which leads to an increase in available surface area for a reaction to occur.

Preferably, the axial distance between the first impeller and the second impeller is at least one impeller diameter apart. In this configuration, the turbulence created by the opposing impellers is an equilibrium in the central mixing zone which allows for prediction of bubble size and therefore control of the reaction occurring.

It is preferable that the total power drawn by the combination of impellers is low. Preferably, the impellers operate at a low power number, preferably substantially between 1 to 5, more preferably, substantially between 1 to 3, most preferably substantially 1.75. In so doing, the system consumes less energy than conventional systems which operate at power numbers of typically 3.2. The power may be measured using conventional equipment, for example, strain gauges.

Preferably, when operating at a low power number complete uniform dispersed phase distribution is achieved. This is highly desirable and is because of the energy efficiency of the blades, preferably hydrofoil blades.

Without being restricted by theory, one possible explanation for the efficiency of the invention is that the use of hydrofoil blades reduces tip vortices and converts more of the shaft energy into flow rather than turbulent kinetic energy, aiding complete dispersion.

Preferably, the specific power used when the first impeller and the second impeller rotate is substantially between 50 W/m$^3$ to 900 W/m$^3$, more preferably, substantially between 100 W/m$^3$ to 800 W/m$^3$.

Preferably, when dual opposed Maxflo type impellers are used in the system, the preferred specific power is substantially between 50 W/m$^3$ to 900 W/m$^3$. Preferably, when BT-6 type impellers are used, the preferred specific power is substantially between 400 W/m$^3$ to 3200 W/m$^3$. At such specific powers, a narrow bubble size distribution is maintained and the reaction is controlled.

Preferably, when dual opposed Maxflo impellers are used, the arithmetic mean size ($d_{10}$) is substantially between 250 µm to 550 µm and the surface volume mean diameter ($d_{32}$) is substantially between 400 µm to 750 µm. Preferably, when operating at substantially 750 rpm, the $d_{10}$ is substantially between 250 µm to 350 µm, most preferably substantially 296 µm, and preferably, the $d_{32}$ is substantially between 400 µm to 500 µm, most preferably substantially 450 µm. Preferably, when operating at substantially 991 rpm, the $d_{10}$ is substantially between 300 µm to 400 µm, most preferably substantially 330 µm, and preferably, the $d_{32}$ is substantially between 460 µm to 560 µm, most preferably substantially 510 µm. Preferably, when operating at substantially 1200 rpm, the $d_{10}$ is substantially between 350 µm to 450 µm, most preferably substantially 394 µm, and preferably, the $d_{32}$ is substantially between 450 µm to 550 µm, most preferably substantially 500 µm.

Preferably, when BT-6 type impellers are used, the $d_{10}$ is substantially between 250 µm to 1500 µm. Particularly, when operating at substantially 251 rpm, preferably the $d_{10}$ is substantially between 550 µm to 650 µm, most preferably substantially 633 µm, and the $d_{32}$ is preferably substantially between 800 µm to 1000 µm, most preferably substantially 978 µm. Preferably, when operating at substantially 380 rpm, the $d_{10}$ is preferably substantially between 800 µm to 900 µm, most preferably substantially 841 µm, and the $d_{32}$ is preferably substantially between 1000 µm to 1500 µm, most preferably substantially 1345 µm. At substantially 500 rpm, the $d_{10}$ is preferably substantially between 500 µm to 600 µm, most preferably substantially 597 µm, and the $d_{32}$ is preferably substantially between 700 µm to 800 µm, most preferably substantially 721 µm. Preferably, when operating at substantially 765 rpm, the $d_{10}$ is preferably substantially between 300 µm to 400 µm, most preferably substantially 378 µm, and the $d_{32}$ is preferably substantially between 400 µm to 500 µm, most preferably substantially 445 µm.

In a reactor where gas is sparged into an agitated liquid medium, preferably, the sparged gas rate is substantially between 0.05 to 1.0 m$^3$/s, preferably substantially between 0.1 to 0.5 m$^3$/s, most preferably substantially 0.13 m$^3$/s at an impeller speed of preferably between 50 rpm to 1200 rpm, most preferably substantially 50 rpm to 200 rpm.

A key parameter used in the design of gas-liquid mixing systems is the critical dispersion speed. This is the minimum impeller speed required to ensure uniform dispersion of the gas bubbles. The critical dispersion speed for achieving dispersion in a dual opposed flow hydrofoil system in a vessel having a diameter of preferably substantially between 1 to 10 m, more preferably, substantially between 2 to 5 m, is preferably substantially between 1 to 100 rpm, preferably substantially between 5 to 50 rpm, more preferably substantially between 10 to 20 rpm, most preferably substantially 14 rpm.

Accordingly, in a further aspect of the present invention there is provided a chemical reaction system comprising a liquid phase and a mixing apparatus according to the first aspect of the invention for mixing a fluid into the liquid phase. Preferably, the fluid is a solid or most preferably, the fluid is a gas.

Preferably, the liquid phase comprises at least one liquid phase reactant for reacting with a gas introduced into the liquid phase, as well as at least one liquid phase reaction product. Preferably, the liquid phase includes a gas introduced therein. Preferably, the said gas comprises one or more reactants capable of reacting with the said one or more reactants. Preferably, the liquid phase comprises a catalyst system. Preferably, the reaction system is a carbonylation reaction system such as one described in co-pending United Kingdom patent application GB 0516556.8 or as referred to in European patents and patent applications EP-A-0055875, EP-A-04489472, EP-A-0106379, EP-A-0235864, EP-A-0274795, EP-A-0499329, EP-A-0386833, EP-A-0441447, EP-A-0489472, EP-A-0282142, EP-A-0227160, EP-A-0495547, EP-A-0495548, EP-A-1651587, EP-A-1565425, EP-A-1554039, EP-A-1534427, EP-A-1527038, EP-A-1204476, WO2005118519 and WO2005079981.

Preferably, the reaction system is a carbonylation process comprising carbonylating an ethylenically unsaturated compound with carbon monoxide in the presence of a source of hydroxyl groups, preferably, methanol, and a catalyst system comprising (a) a bidentate phosphine, arsine or stibine ligand, and (b) a catalytic metal selected from a group 8, 9 or 10 metal or a compound thereof, preferably palladium. Preferably, the phosphine ligand is selected from 1,2-bis-(di-tert-butylphosphinomethyl)benzene, 1,2-bis-(di-tert-pentylphosphinomethyl)benzene, 1,2-bis-(di-tert-butylphosphinomethyl)naphthalene, 1,2 bis(diadamantylphosphinomethyl)benzene, 1,2 bis(di-3,5-dimethyladamantylphosphinomethyl)benzene, 1,2 bis(di-5-tert-butyladamantylphosphinomethyl)benzene, 1,2 bis(1-adamantyl tert-butyl-phosphinomethyl)benzene, 1-(diadamantylphosphinomethyl)-2-(di-tert-butylphosphinomethyl)benzene, 1-(di-tert-butylphosphinomethyl)-2-(dicongressylphosphinomethyl)benzene, 1-(di-tert-butylphosphinomethyl)-2-(phospha-adamantyl-P-methyl)benzene, 1-(diadamantylphosphinomethyl)-2-(phospha-adamantyl-P-methyl)benzene, 1-(tert-butyladamantylphosphinomethyl)-2-(di-adamantylphosphinomethyl)benzene and 1-[(P-(2,2,6,6,-tetra-methylphosphinan-4-one)phosphinomethyl)]-2-(phospha-adamantyl-P-methyl)benzene, wherein "phospha-adamantyl" is selected from 2-phospha-1,3,5,7-tetramethyl-6,9,10-trioxadamantyl, 2-phospha-1,3,5-trimethyl-6,9,10 trioxadamantyl, 2-phospha-1,3,5,7-tetra(trifluoromethyl)-6,9,10-trioxadamantyl or 2-phospha-1,3,5-tri(trifluoromethyl)-6,9,10-trioxadamantyl; 1,2-bis-(dimethylaminomethyl)ferrocene, 1,2-bis-(ditertbutylphosphinomethyl) ferrocene, 1-hydroxymethyl-2-dimethylaminomethylferrocene, 1,2-bis- (ditertbutylphosphinomethyl)ferrocene, 1-hydroxymethyl-2,3-bis-(dimethylaminomethyl)ferrocene, 1,2,3-tris-(ditertbutylphosphinomethyl)ferrocene, 1,2-bis-(dicyclohexylphosphinomethyl)ferrocene, 1,2-bis-(di-isobutylphosphinomethyl)ferrocene, 1,2-bis-(dicyclopentylphosphinomethyl)ferrocene, 1,2-bis-(diethylphosphinomethyl)ferrocene, 1,2-bis-(di-isopropylphosphinomethyl)ferrocene, 1,2-bis-(dimethylphosphinomethyl)ferrocene, 1,2-bis-(di-(1,3,5,7-tetramethyl-6,9,10-trioxa-2-phospha-adamantylmethyl))ferrocene, 1,2-bis-(dimethylaminomethyl)ferrocene-bismethyl iodide, 1,2-bis(dihydroxymethylphosphinomethyl)ferrocene, 1,2-bis(diphosphinomethyl)ferrocene, 1,2-bis-α,α-(P-(2,2,6,6,-tetramethylphosphinan-4-one))dimethylferrocene, and 1,2-bis-(di-1,3,5,7-tetramethyl-6,9,10-trioxa-2-phospha-adamantylmethyl))benzene; cis-1,2-bis(di-t-butylphosphinomethyl)-4,5-dimethyl cyclohexane; cis-1,2-bis(di-t-butylphosphinomethyl)-5-methylcyclopentane; cis-1,2-bis(2-phosphinomethyl-1,3,5,7-tetramethyl-6,9,10-trioxa-adamantyl)-4,5-dimethylcyclohexane; cis-1,2-bis(2-phosphinomethyl-1,3,5,7-tetramethyl-6,9,10-trioxa-adamantyl) 5-methylcyclopentane; cis-1,2-bis(di-adamantylphosphinomethyl)-4,5 dimethylcyclohexane; cis-1,2-bis(di-adamantylphosphinomethyl)-5-methyl cyclopentane; cis-1-(P,P adamantyl, t-butyl phosphinomethyl)-2-(di-t-butylphosphinomethyl)-4,5-dimethylcyclohexane; cis-1-(P,P adamantyl, t-butyl phosphinomethyl)-2-(di-t-butylphosphinomethyl)-5-methylcyclopentane; cis-1-(2-phosphinomethyl-1,3,5,7-tetramethyl-6,9,10-trioxa-adamantyl)-2-(di-t-butylphosphinomethyl)4,5-dimethylcyclohexane; cis-1-(2-phosphinomethyl-1,3,5,7-tetramethyl-6,9,10-trioxa-adamantyl)-2-(di-t-butylphosphinomethyl)-5-methyl cyclopentane; cis-1-(2-phosphinomethyl-1,3,5,7-tetramethyl-6,9,10-trioxa-adamantyl)-2-(diadamantylphosphinomethyl)-5-methyl cyclohexane; cis-1-(2-phosphinomethyl-1,3,5,7-tetramethyl-6,9,10-trioxa-adamantyl)-2-(diadamantylphosphinomethyl)-5-methyl cyclopentane; cis-1-(2-phosphinomethyl-1,3,5,7-tetramethyl-6,9,10-trioxa-adamantyl)-2-(diadamantylphosphinomethyl)cyclobutane; cis-1-(di-t-butylphosphinomethyl)-2-(diadamantylphosphinomethyl)-4,5-dimethyl cyclohexane; cis-1-(di-t-butylphosphinomethyl)-2-(diadamantylphosphinomethyl)-5-methyl cyclopentane; cis-1,2-bis(2-phospha-1,3,5-trimethyl-6,9,10-trioxatricyclo-{3.3.1.1[3.7]}decyl)-4,5-dimethyl cyclohexane; cis-1,2-bis(2-phospha-1,3,5-trimethyl-6,9,10-trioxatricyclo-{3.3.1.1[3.7]}decyl)-5-methyl cyclopentane; cis-1-(2-phospha-1,3,5-trimethyl-6,9,10-trioxatricyclo-{3.3.1.1[3.7]}decyl)-2-(di-t-butylphosphinomethyl)-4,5-dimethyl cyclohexane; cis-1-(2-phospha-1,3,5-trimethyl-6,9,10-trioxatricyclo-{3.3.1.1[3.7]}decyl)-2-(di-t-butylphosphinomethyl)-5-methyl cyclopentane; cis-1-(2-phospha-1,3,5-trimethyl-6,9,10-trioxatricyclo-{3.3.1.1[3.7]}decyl)-2-(diadamantylphosphinomethyl)-4,5-dimethyl cyclohexane; cis-1-(2-phospha-1,3,5-trimethyl-6,9,10-trioxatricyclo-{3.3.1.1[3.7]}decyl)-2-(diadamantylphosphinomethyl)-5-methyl cyclopentane; cis-1,2-bis-perfluoro(2-phospha-1,3,5,7-tetramethyl-6,9,10-trioxatricyclo{3.3.1.1[3.7]}-decyl)-4,5-dimethyl cyclohexane; cis-1,2-bis-perfluoro(2-phospha-1,3,5,7-tetramethyl-6,9,10-trioxatricyclo{3.3.1.1[3.7]}decyl)-5-methyl cyclopentane; cis-1,2-bis-(2-phospha-1,3,5,7-tetra(trifluoro-methyl)-6,9,10-trioxatricyclo{3.3.1.1[3.7]}decyl)-4,5-dimethyl cyclohexane; cis-1,2-bis-(2-phospha-1,3,5,7-tetra(trifluoro-methyl)-6,9,10trioxatricyclo{3.3.1.1[3.7]}decyl)-5-methyl cyclopentane; cis-1,2-bis(di-t-butylphosphinomethyl)cyclohexane; cis-1,2-bis(di-t-butylphosphinomethyl)cyclopentane; cis-1,2-bis(di-t-butylphosphinomethyl)cyclobutane; cis-1,2-bis(2-phosphinomethyl-1,3,5,7-tetramethyl-6,9,10-trioxa-adamantyl)cyclohexane; cis-1,2-bis(2-phosphinomethyl-1,3,5,7-tetramethyl-6,9,10-trioxa-adamantyl)cyclopentane; cis-1,2-bis(2-phosphinomethyl-1,3,5,7-tetramethyl-6,9,10-trioxa-adamantyl)cyclobutane; cis-1,2-bis(di-adamantylphosphinomethyl)cyclohexane; cis-1,2-bis(di-adamantylphosphinomethyl)cyclopentane; cis-1,2-bis(di-adamantylphosphinomethyl)cyclobutane; cis-1-(P,P-adamantyl, t-butyl-phosphinomethyl)-2-(di-t-butylphosphinomethyl)cyclohexane; cis-1-(P,P-adamantyl, t-butyl-phosphinomethyl)-2-(di-t-butylphosphinomethyl)cyclopentane; cis-1-(P,P-adamantyl, t-butyl-phosphinoethyl)-2-(di-t-butylphosphinomethyl)cyclobutane; cis-1-(2-phosphinomethyl-1,3,5,7-tetramethyl-6,9,10-trioxa-adamantyl)-2-(di-t-butylphosphinomethyl)cyclohexane; cis-1-(2-phosphinomethyl-1,3,5,7-tetramethyl-6,9,10-trioxa-adamantyl)-2-(di-t-butylphosphinomethyl)cyclopentane; cis-1-(2-phosphinomethyl-1,3,5,7-tetramethyl-6,9,10-trioxa-adamantyl)-2-(di-t-butylphosphinomethyl)cyclobutane; cis-1-(2-phosphinomethyl-1,3,5,7-tetramethyl-6,9,10-trioxa-adamantyl)-2-(diadamantylphosphinomethyl)cyclohexane; cis-1-(2-phosphinomethyl-1,3,5,7-tetramethyl-6,9,10-trioxa-adamantyl)-2-(diadamantylphosphinomethyl)cyclopentane; cis-1-(2-phosphinomethyl-1,3,5,7-tetramethyl-6,9,10-trioxa-adamantyl)-2-(diadamantylphosphinomethyl)cyclobutane; cis-1-(di-t-butylphosphinomethyl)-2-(diadamantylphosphinomethyl)cyclohexane; cis-1-(di-t-butylphosphinomethyl)-2-(diadamantylphosphinomethyl)cyclopentane; cis-1-(di-t-butylphosphinomethyl)-2-(diadamantylphosphinomethyl)cyclobutane; cis-1,2-bis(2-phospha-1,3,5-trimethyl-6,9,10-trioxatricyclo-{3.3.1.1[3.7]}decyl)cyclohexane; cis-1,2-bis(2-phospha-1,3,5-trimethyl-6,9,10-trioxatricyclo-{3.3.1.1[3.7]}decyl)cyclopentane; cis-1,2-bis(2-phospha-1,3,5-trimethyl-6,9,10-trioxatricyclo-{3.3.1.1[3.7]}decyl)cyclobutane; cis-1-(2-phospha-1,3,5-trimethyl-6,9,10-trioxatricyclo-{3.3.1.1[3.7]}decyl)-2-(di-t-butylphosphinomethyl)cyclohexane; cis-1-(2-phospha-1,3,5-trimethyl-6,9,10-trioxatricyclo-{3.3.1.1[3.7]}decyl)-2-(di-t-butylphosphinomethyl)cyclopentane; cis-1-(2-phospha-1,3,5-trimethyl-6,9,10-trioxatricyclo-{3.3.1.1[3.7]}decyl)-2-(di-t-butylphosphinomethyl)cyclobutane; cis-1-(2-phospha-1,3,5-trimethyl-6,9,10-trioxatricyclo-{3.3.1.1[3.7]}decyl)-2-(diadamantylphosphinomethyl)cyclohexane; cis-1-(2-phospha-1,3,5-trimethyl-6,9,10-trioxatricyclo-{3.3.1.1[3.7]}decyl)-2-(diadamantylphosphinomethyl)cyclopentane; cis-1-(2-phospha-1,3,5-trimethyl-6,9,10-trioxatricyclo-{3.3.1.1[3.7]}decyl)-2-(diadamantylphosphinomethyl)cyclobutane; cis-1,2-bis-perfluoro(2-phospha-1,3,5,7-tetramethyl-6,9,10-trioxatricyclo{3.3.1.1[3.7]}-decyl)cyclohexane; cis-1,2-bis-perfluoro(2-phospha-1,3,5,7-tetramethyl-6,9,10-trioxatricyclo{3.3.1.1[3.7]}decyl)cyclopentane; cis-1,2-bis-perfluoro(2-phospha-1,3,5,7-tetramethyl-6,9,10-trioxatricyclo{3.3.1.1[3.7]}decyl)cyclobutane; cis-1,2-bis-(2-phospha-1,3,5,7-tetra(trifluoro-methyl)-6,9,10-trioxatricyclo{3.3.1.1[3.7]}decyl)cyclohexane; cis-1,2-bis-(2-phospha-1,3,5,7-tetra(trifluoro-methyl)-6,9,10-trioxatricyclo{3.3.1.1[3.7]}decyl)cyclopentane; and cis-1,2-bis-(2-phospha-1,3,5,7-tetra(trifluoro-methyl)-6,9,10-trioxatricyclo{3.3.1.1[3.7]}decyl)cyclobutane; (2-exo,3-exo)-bicyclo[2.2.1]heptane-2,3-bis(di-tert-butylphosphinomethyl) and (2-endo, 3-endo)-bicyclo[2.2.1]heptane-2,3-bis(di-tert-butylphosphinomethyl).

The bubble size produced by the invention may be small and therefore a large surface area is provided for interface mass transfer to take place. Furthermore, because the bubble size distribution is narrow with small deviation, the carbonylation reaction can be controlled.

All of the features described herein may be combined with any of the above aspects, in any combination unless such combinations are mutually exclusive.

An embodiment of the invention will now be described, by way of example only, with reference to the accompanying drawings, wherein.

Figure 1:
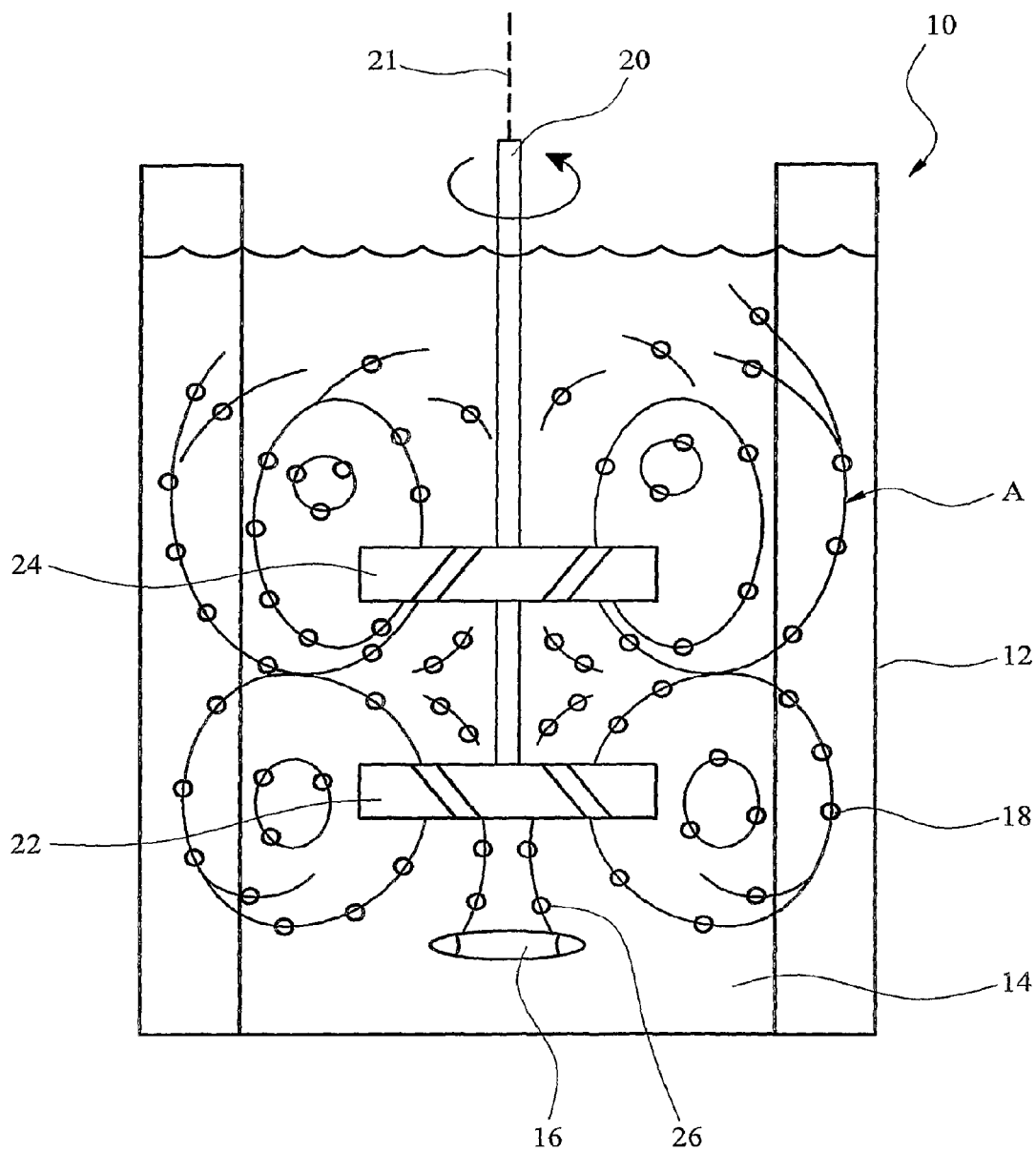
FIG. 1 is a schematic sectional side view of a prior art mixing apparatus.

FIG. 1 shows a prior art mixing apparatus 10 in use in a vessel 12 containing a liquid 14. The vessel 12 has an inlet 16 through which a gas 18 is sparged into the liquid 14. The mixing apparatus 10 comprises a vertical elongate shaft 20 rotatable about a longitudinal axis 21 on which are fixedly mounted a first impeller 22 and a second impeller 24 in spaced apart relation. The first impeller 22 is mounted above the second impeller 24. Both the first and the second impellers 22,24 are 45° pitched blade turbines.

In use, said impellers must rotate at the same speed. The first impeller 22 causes incoming gas bubbles 26 to flow in a both an axial and radial direction. The axial component of the flow creates momentum, which along with buoyancy, prevents the second impeller 24 from operating effectively. The momentum and buoyancy is only overcome by increasing the speed of the impellers 22, 24. This increase in speed causes full dispersion of the gas 18 in the liquid 14 as shown in FIG. 1 by the lines A. Non-uniform dispersion of the liquid 14 in the gas 18 is undesirable because the mixing process cannot be controlled.

Figure 2:
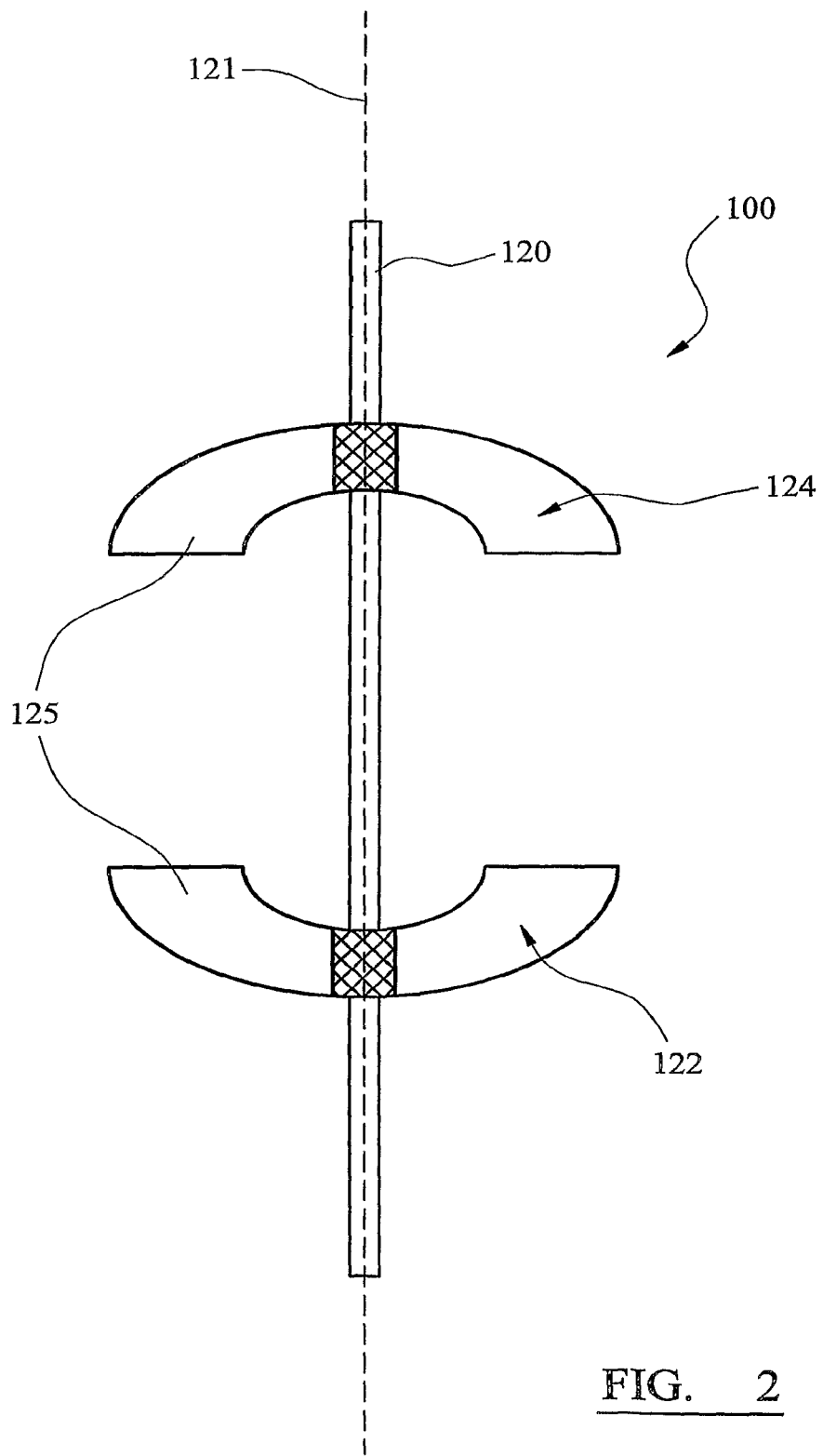
FIG. 2 is a schematic sectional side view of a mixing apparatus according to the invention.

FIG. 2 shows a mixing apparatus 100 according to the present invention. The mixing apparatus 100 comprises a vertical elongate shaft 120 rotatable about a longitudinal axis 121 on which are fixedly mounted a first impeller 122 and a second impeller 124 in a spaced apart arrangement. Both the first and the second impeller 122, 124 comprise a number of hydrofoil blades 125. Each impeller 122,124 comprises four radially extending blades 125 fixedly mounted on the shaft 120 for co-operating rotation about the longitudinal axis of the shaft, in use. Each blade 125 on each impeller 122,124 is a hydrofoil blade arranged so as to impel the surrounding fluid axially in the direction of the other impeller. The first or lower impeller 122 is thus an up-pumping impeller and the second or upper impeller 124 is a down-pumping impeller. Although only two blades 125 can be seen in the figure, it will be understood by a skilled person, that any number of blades may be used on each of the said impellers, for example, 3, 4 or even 6 blades. Particularly suitable commercially available impellers are those known as Maxflo™ W, A315, A320 or A340 impellers.

The first impeller 122 is mounted on the shaft 120 so that the concave face of the blades 125 face in an upward direction. The second impeller 124 is spaced along the shaft 120 and is mounted so that the concave face of the blades 125 face in a downwards direction. The distance between the first impeller 122 and the second impeller 124 is approximately the diameter of either of the said impellers 122, 124.

Figure 3:
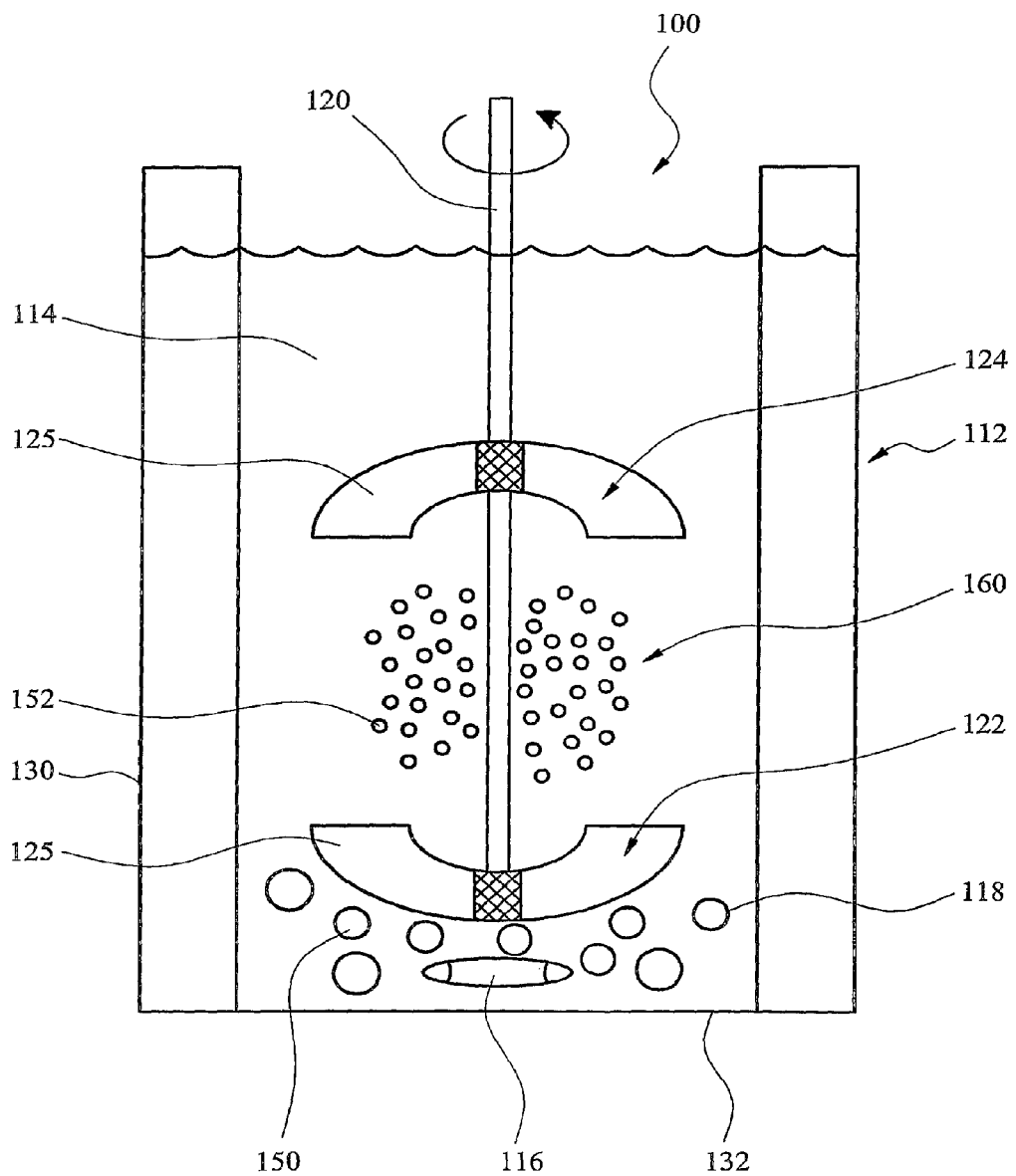
FIG. 3 is a schematic sectional side view of a mixing apparatus according to the invention in use.

FIG. 3 shows the mixing apparatus 100 in a cylindrical vessel 112. A gas inlet 116 is located in the bottom-wall 132 of the vessel 112 adjacent to the base 132. It will be appreciated that the vessel 112 can be of any suitable alternative configuration, for example, it may be a hopper. The mixing apparatus 100 is centrally suspended in the vessel 112.

Although only one mixing apparatus 100 is shown in FIG. 3, it will be appreciated that any number of mixing apparatus 100 could be used in the chamber 112. For example, two, three, or four mixing apparatus 100 may be mounted in the chamber 112.

Figure 4:
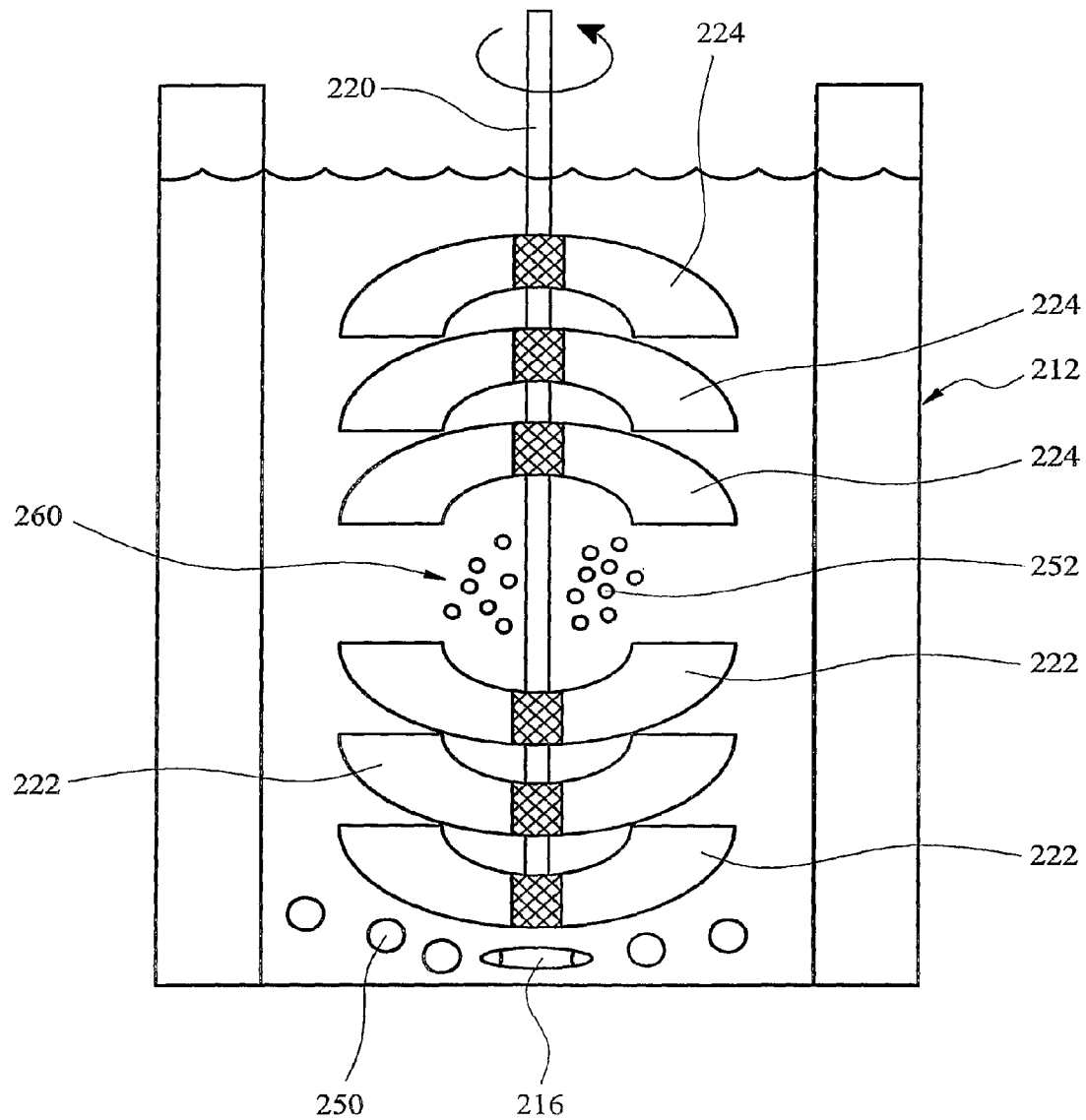
FIG. 4 is a further schematic sectional side view of a mixing apparatus according to the invention in use.

It will also be understood that any number of first or second impellers 122,124 may be mounted on the shaft 120 and in keeping with the object of the invention. For example, the arrangement 200 shown in FIG. 4, wherein a series of first impellers 222 and a series of second impellers 224 are mounted on the shaft 220. Any number of impellers 222,224 may be provided on the shaft 220.

An alternative configuration would comprise pairs of impellers mounted on the shaft. Each pair would comprise a first impeller and a second impeller. There may be a number of pairs of impellers on any given shaft, for example, two, three, or four pairs. In such an arrangement, the fluid, for example, gas, may be introduced into the chamber through the base or the side wall thereof, being directed under and towards the first impeller.

The first or the second impeller may be driven by a separate drive means so that the rotational speed of, for example, the first impeller, may be different to the rotational speed of the said other impeller.

The diameter of the first and second impellers may not necessarily be the same in any one of the embodiments shown. Further, the optimum distance between two impellers is dependent upon the geometry of the vessel and the diameter of said impellers.

In use, as in the illustrated carbonylation reaction, the vessel 112,212 is filled with fluid 114,214. A gas 118,218 is then directed into the vessel 112,212 via gas inlet 116,216. The shaft 120,220 is rotated by a suitable drive means (not shown), so as to cause the first impeller 122,222 and the second impeller 124,224 to rotate about the longitudinal axis 121,221 of the shaft 120,220 in a liquid 114.

The gas 118,218 enters the vessel 112,212 as large bubbles 150,215. Rotation of the first impeller 122,222 causes the large bubbles 150,215 to move in an axial direction towards the blades 125,225. The large bubbles 150,250 impact on the blades 125,225 and are broken up into a number of small bubbles 152,252 in the region of high turbulent energy dissipation. Small bubbles follow the liquid flow path which is initially axial then radial.

The second impeller 124,224 causes axial flow in a downwards direction towards the first impeller 122,222. Due to the opposing axial flow paths created by said impellers, a central zone 160,260, or high turbulent energy dissipation zone, is established. The central zone 160,260 comprises an area of comparatively uniform high turbulent energy dissipation with high interfacial area to allow reaction between reactants in the liquid 114,214 and in reactants in the gas 118,218. Further, because the turbulent energy dissipation in the central zone 160,260 is maintained without much variation, a narrow size distribution of small bubbles is produced. Such a narrow size distribution enables the reactor performance to be predicted and controlled.

The mixing apparatus 100,200 is particularly suited to carbonylation processes.

Table 1 gives an example of resultant bubble size for a dual opposed Maxflo impeller system operating at various speeds, and at 4.2 mm/sec. The bubble size was determined using a typical image capture camera.

TABLE 1

| | N (rpm) | | |
|---|---|---|---|
| | 750 | 991 | 1200 |
| $d_{10}$ (μm) | 296 | 330 | 394 |
| $d_{32}$ (μm) | 450 | 510 | 500 |

It is a distinct advantage to be able to control the reaction occurring between two fluids, particularly a liquid and a gas. It is also especially favorable to be able to promote effective and efficient mixing and interphase mass transfer between at least two fluids. When applied to industrial processes, such advantages are of high commercial value.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for mixing a fluid into a liquid phase in a chemical reaction system comprising mixing the fluid into the liquid phase by use of a mixing apparatus, the mixing apparatus comprising a shaft rotatable about its longitudinal axis, a first radially extending impeller and a second radially extending impeller mounted on the shaft and respectively axially spaced apart, the first impeller comprising a plurality of curved blades operable to move said fluids in an axial direction towards the second impeller, and the second impeller comprising a plurality of curved blades operable to move said fluids in an axial direction towards the first impeller, wherein the fluid comprises a gas; wherein said impellers operate at a power number substantially between 1 to 3.

2. A method according to claim 1, wherein said impellers operate at a power number substantially 1.75.

3. A method according to claim 1, wherein the specific power used when the first impeller and the second impeller rotate is substantially between 100 W/m$^3$ to 800 W/m$^3$.

4. A method according to claim 1, wherein the arithmetic mean size ($d_{10}$) of bubbles created by rotation of the first and second impellers is substantially between 250 μm to 550 μm and the surface volume mean diameter ($d_{32}$) of bubbles created by rotation of the first and second impellers is substantially between 400 μm to 750 μm.

5. A method according to claim 1, wherein the arithmetic mean size $d_{10}$ of bubbles created by rotation of the first and second impellers is substantially between 250 μm to 1500 μm.

6. A method according to claim 1, wherein when operating at substantially 765 rpm, the arithmetic mean size ($d_{10}$) of bubbles created by rotation of the first and second impellers is substantially 378 μm, and the surface volume diameter ($d_{32}$) of bubbles created by rotation of the first and second impellers is substantially 445 μm.

7. A method according to claim 1, wherein the gas is sparged into the liquid phase at a sparged gas rate of substantially between 0.05 to 1.0 m$^3$/s.

8. A method according to claim 1, wherein the gas is sparged into the liquid phase at a sparged gas rate of substantially 0.13 m$^3$/s at an impeller speed of substantially 50 rpm to 200 rpm.

9. A method according to claim 1, wherein an apparatus vessel in which the first impeller and the second impeller are mounted has a diameter of substantially between 2 to 5 m, and a critical dispersion speed of substantially between 10 to 20 rpm.

10. A carbonylation process comprising carbonylating an ethylenically unsaturated compound with carbon monoxide in the presence of a source of hydroxyl groups, and a catalyst system comprising
(a) a bidentate phosphine, arsine or stibine ligand, and
(b) a catalytic metal selected from a group 8, 9 or 10 metal or a compound thereof, wherein the process comprises mixing a liquid and a gas by use of a mixing apparatus, the mixing apparatus comprising a shaft rotatable about its longitudinal axis, a first radially extending impeller and a second radially extending impeller mounted on the shaft and respectively axially spaced apart, the first impeller comprising a plurality of curved blades operable to move said fluids in an axial direction towards the second impeller, and the second impeller comprising a plurality of curved blades operable to move said fluids in an axial direction towards the first impeller;
wherein said impellers operate at a power number substantially between 1 to 3.

11. A carbonylation process according to claim 10, wherein the liquid phase comprises at least one liquid phase reactant for reacting with a gas introduced into the liquid phase, as well as at least one liquid phase reaction product.

* * * * *

UNITED STATES PATENT AND TRADEMARK OFFICE
CERTIFICATE OF CORRECTION

PATENT NO. : 9,138,694 B2  
APPLICATION NO. : 13/763393  
DATED : September 22, 2015  
INVENTOR(S) : Gobby et al.

It is certified that error appears in the above-identified patent and that said Letters Patent is hereby corrected as shown below:

Title Page, item (63) in the Related U.S. Application Data,

"Continuation of Application No. 12/300,072, filed as Application No. PCT/GB2007/015424 on April 25, 2007" should be --Continuation of Application No. 12/300,072, filed as Application No. PCT/GB2007/001524 on April 25, 2007--.

Signed and Sealed this  
Fifth Day of July, 2016

Michelle K. Lee  
*Director of the United States Patent and Trademark Office*